United States Patent [19]

Motonami et al.

[11] 4,248,456
[45] Feb. 3, 1981

[54] SEATBELT SYSTEM

[75] Inventors: Masanao Motonami; Jun Yasumatsu, both of Aichi; Tatsushi Kubota, Okazaki, all of Japan

[73] Assignees: Toyota Jidosha Kogyo Kabushiki Kaisha; Kabushiki Tokai-Rika-Denki Seisakusho, both of Aichi, Japan

[21] Appl. No.: 37,152

[22] Filed: May 8, 1979

[30] Foreign Application Priority Data

Sep. 18, 1978 [JP] Japan ............................ 53-127717[U]

[51] Int. Cl.³ ............................................. B60R 21/10
[52] U.S. Cl. ....................................... 280/802; 280/806
[58] Field of Search ............... 280/806, 807, 802, 803, 280/804; 297/480, 478, 479, 476, 474; 242/107.2

[56] References Cited

U.S. PATENT DOCUMENTS

| 3,249,386 | 5/1966 | Board et al. | 242/107.2 |
| 3,897,963 | 8/1975 | Seiffert et al. | 280/802 |
| 4,128,261 | 12/1978 | Paitula | 297/478 |

FOREIGN PATENT DOCUMENTS

| 2439497 | 2/1976 | Fed. Rep. of Germany | 280/802 |
| 2600613 | 7/1976 | Fed. Rep. of Germany | 297/480 |
| 2250283 | 5/1975 | France | 297/478 |
| 2355523 | 1/1978 | France | 280/802 |

Primary Examiner—John A. Pekar
Attorney, Agent, or Firm—Koda and Androlia

[57] ABSTRACT

A seatbelt system for a motor vehicle which automatically fastens or unfastens the belt around the passenger which includes a passenger restraining belt and a retractor mechanism coupled to the top of a tunnel located on an approximate center line of the motor vehicle. The seatbelt system further includes a direct locking device which is coupled to the vehicle body on the side of the tunnel below the retractor mechanism. The locking device is arranged and configured such that it directly locks the intermediate portion of the belt during a vehicular emergency such that the belt is prevented from extending and the anchor point for the belt is lowered.

12 Claims, 4 Drawing Figures

SEATBELT SYSTEM

BACKGROUND OF THE INVENTION

1. Field of Invention

This invention relates to seatbelt systems and more particularly to seatbelt systems which include a means for locking the passenger restraining belt during a vehicular emergency.

2. Prior Art

Seatbelt systems restrain passengers during vehicular emergencies by fastening a passenger restraining belt around the passenger and anchoring the ends of the belt to the vehicle body to thereby prevent the passenger from colliding with dangerous objects. Furthermore, in order to prevent any interference of the passengers freedom of movement under normal vehicle operating conditions, at least one end of the belt is anchored to the vehicle body via a retractor mechanism which power retracts the belt. The retractor mechanism includes an inertial locking mechanism which abruptly stops the extension of the belt only during a vehicular emergency. The inertial locking mechanism includes ratchet wheels which are coupled to a retractor shaft which retracts the end of the belt. During a vehicular emergency, a pawl which is actuated by an acceleration sensing device is caused to engage with the ratchet wheels. This action stops the rotation of the retractor shaft so that the belt cannot be extended from the retractor mechanism.

In such retractor mechanism, however, even though rotation of the retractor shaft in the direction of belt extensions immediately stops when a vehicular emergency occurs, the belt wound around the retractor shaft in successive layers continues to be extended until the layers of the belt are wound in tight contact with each other; i.e. the belt is tightened down on the retractor shaft. Accordingly, the restraint of the passenger is incomplete and as a result the safety of the passenger cannot always be guaranteed.

To overcome this problem seatbelt systems have been proposed; however each of such seatbelt systems has its own disadvantages and shortcomings.

SUMMARY OF THE INVENTION

Accordingly it is the general object of the present invention to provide a seatbelt system which securely stops the passenger and stops the passenger restraining belt during a vehicular emergency.

It is still another object of the present invention to provide a seatbelt system which still allows the passenger freedom of movement.

It is yet another object of the present invention to provide a seatbelt system which increases the degree of design freedom in a motor vehicle.

In keeping with the principles of the present invention, the objects are accomplished by a unique seatbelt system which includes a retractor mechanism and a direct locking device for the passenger restraining belt provided separately in the motor vehicle. The direct locking device installed on a tunnel side of a tunnel which runs along the floor of the vehicle such that the anchor part for the passenger restraint is lowered while the retractor mechanism is installed on the top of the tunnel.

BRIEF DESCRIPTION OF THE DRAWINGS

The above mentioned features and objects of the present invention will become apparent with reference to the following description taken in conjunction with the accompanying drawings wherein like reference numerals denote like elements and in which.

DETAILED DESCRIPTION OF THE INVENTION

Figure 1:
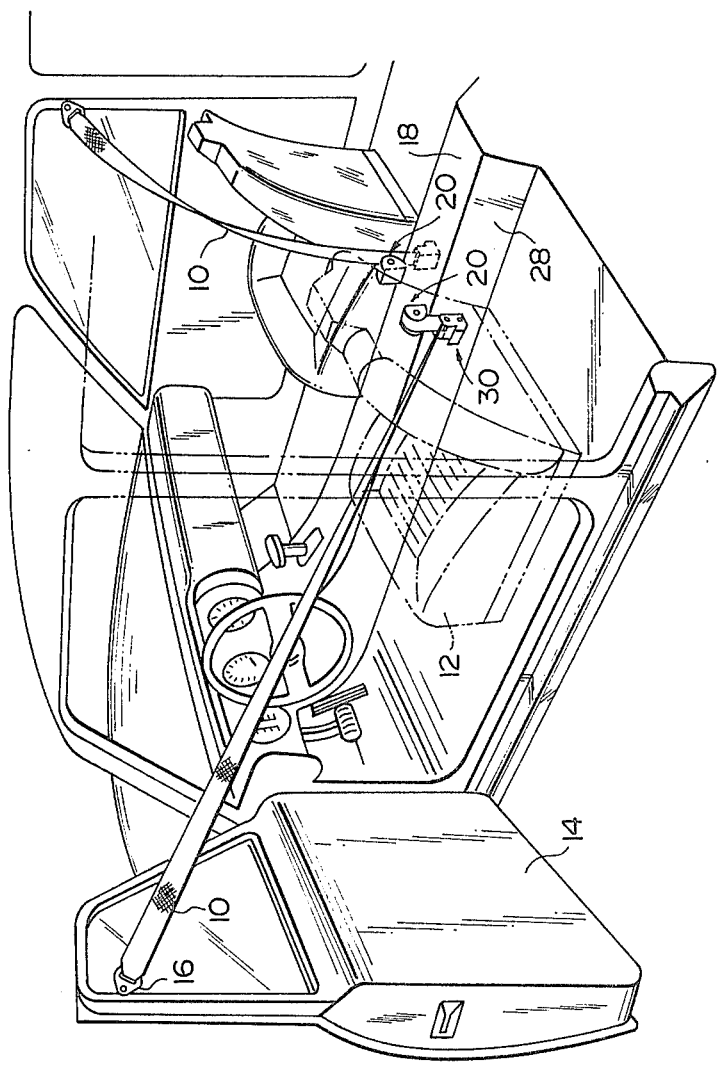
FIG. 1 is an oblique view illustrating a first embodiment of a seatbelt system in accordance with the teachings of the present invention.
Figure 2:
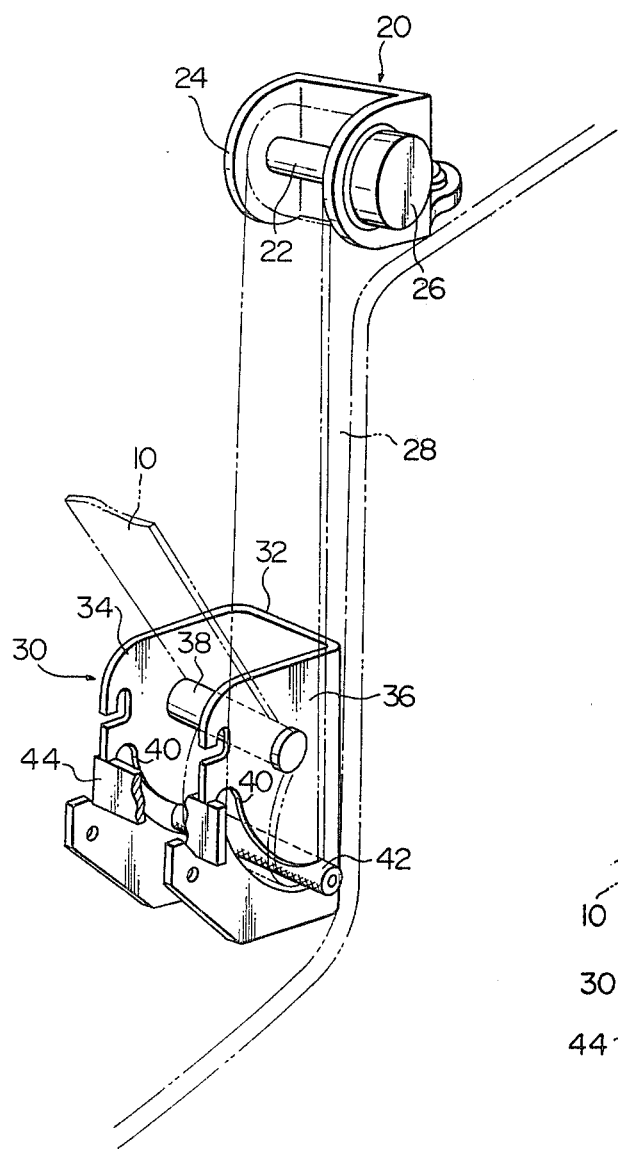
FIG. 2 is a magnified view of a portion of FIG. 1.
Figure 3:
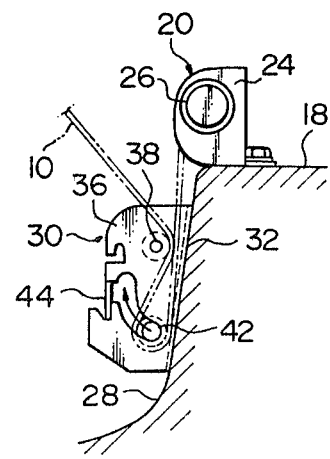
FIG. 3 is a side view of FIG. 2.

Referring more particularly to Figures, shown in one is the first embodiment of a seatbelt system in accordance with the teachings of the present invention. In FIG. 1, each passenger restraining belt 10 is arranged so that it can be fastened diagonally across the upper body of the passenger seated in the corresponding passenger seat 12. One end of each belt 10 is anchored near a shoulder anchor 16 to the upper rear portion of a corresponding door 14. The other end of belt 10 is retracted on a retractor shaft 22 of a retractor mechanism 20 fastened to the top of a tunnel 18 of a vehicle. Each of the retractor mechanisms 20 includes a retractor shaft 22 mounted in a C-shape frame and a spring retractor device 26 interposed between the retractor shaft 22 and C-shape frame 24 so that the belt 10 is driven in the direction of belt retraction. Accordingly, the closing or opening of the corresponding door 14 causes the intermediate portion of each belt 10 to approach or move away from the passenger seated in the corresponding passenger seat 12. Thus, the intermediate portion of the belt 10 acts as a passenger restraining belt which can be automatically fastened around or removed from the passenger.

Furthermore, direct locking devices 30 are provided on the tunnel side areas 28 of the tunnel 18 subjacent the associated retractor mechanism 20. Each of the direct locking devices 30 has a C-shaped frame 32 and a guide shaft 38 which is mounted between the parellel leg parts 34 and 36 of the C-shaped frame 32. Furthermore, guide slots 40, each of which is curved in an appropriate curvature along its longitudinal axis, are formed in the lower portions of the parellel legs 34 and 36. In each of the locking devices 30, the ends of the belt turning bar 42 are provided in the lower ends of the guide slot 40.

Each of the belts 10 moving downward from the passenger restraining portion of the belt is turned in opposite directions around the guide shaft 38 and the belt turning bar 42 and is then retracted on the retractor shaft 22 of the corresponding retractor mechanism 20. Accordingly, when the passenger opens or closes one of the doors 14, the corresponding belt, which is extended from the retractor mechanism 20 or retracted on the retractor shaft 22, rubs against the guide shaft 38 and belt turning bar 42 as it moves. It would also be possible to install rollers which rotate with a low resistance around the circumference of the guide shafts 38 and belt turning bar 42. The width of intermediate portions of guide slots 40 are made greater than the external diameter of the belt turning bar 42 so that the belt turning bar 42 can move freely towards the upper ends of the guide slot 40 when it moves out of the lower end of the guide slot 40. Furthermore, both ends of locking plate 44 are fastened to leg parts 34 and 36 near the upper ends of guide slots 40. Locking plate 44 is arranged and configured such that the belt turning bar 42 can approach it very closely. Thus, a so-called direct locking device is formed which operates in the manner described below.

In operation, when the tension on the corresponding belt 10 exceeds a given valve, the belt turning bar moves upward from the lower ends of the guide slots 40 until it reaches the upper end of the guide slot 40 and approaches the walking plate 44. As a result, intermediate portion of belt 10 is locked between the belt turning bar 22 and the locking plate 44 so that movement of the belt 10 in the direction of its length is stopped. Furthermore, it is desireable that the direct locking device be designed such that the turning bar 42 presses the belt 10 more strongly against the locking plate 44 as the tension increases.

Furthermore, in FIG. 1, the passenger has opened one of the vehicle doors 14 in order to enter the vehicle. In this case, only the force of the spring retractor device 26 in the corresponding retractor mechanism 20 acts on the belt 10. Therefore, the belt turning bar 42 of the corresponding direct locking device 30 is still in the lower end of the guide slot 40 and the belt 10 can move in the direction of its own length rubbing around the circumferences of the belt turning bar 42 and the guide shaft 38.

When the passenger closes the door 14 after seating himself in the passengers seat, the shoulder anchor 16 is caused to move toward the rear of the vehicle in accordance with the circular arc motion of the closing door 14. As a result an intermediate portion of the belt 10 approaches the seated passenger. Since the shoulder anchor 16 simultaneously moves toward the direct locking device 30, the excess belt 10 passes through the direct locking device 30 and is retracted by the retractor mechanism 20. In this manner the belt 10 is automatically fastened about the passenger.

In addition, under normal vehicle operating conditions, only the force of the spring retractor device 26 of the retractor mechanism 20 acts on the belt 10. As a result, the belt 10 can be freely extended against this force. Accordingly, the passenger is able to adjust his driving posture so that a comfortable driving position can be maintained.

If the vehicle becomes involved in an emergency such as a collision, etc., the passenger is thrown violently in the direction of the vehicle impact. As a result, a large tension acts on the belt 10 during the initial stage of the movement of the passenger. This tension acts on the belt turning bar 42 via the belt 10. As a result, the belt turning bar 42 moves out of the lower end of the guide slot 40 and into the upper end of the guide slot 40 where it clamps the belt 10 directly against the locking plate 44 so that movement of the belt 10 in the direction of its own length is prevented. In this manner the passenger is restrained by the belt 10 running between the belt turning bar 42 and the shoulder anchor 16. As a result, the passenger is prevented from moving any great distance in the direction of impact and the safety of the passenger is thus insured. Furthermore in this case, only the stretching of that portion of the belt 10 located between the shoulder anchor 16 and the belt turning bar 42 affects the passenger in terms of the distance he can move in the direction of impact. The stretching of that portion of the belt 10 located between the belt turning bar 42 and the retractor shaft 22 of the retractor mechanism has little or no effect. Accordingly, the restraint of the passenger is very secure.

Furthermore, it should be apparent that in the structure described above that each belt 10 is supported on the vehicle body via the corresponding direct locking device 30 during a vehicular emergency; or in otherwords, that the belt turning bar 42 becomes the anchor point at which each belt 10 is anchored to the vehicle body.

Since each direct locking device 30 is located below and to the side of the corresponding passenger seat 12 the corresponding belt 10 is anchored to the vehicle body at a low point. Therefore, passenger safety is improved. Specifically, in cases where both the direct locking device 30 and the retractor mechanism 20 for each belt 10 are installed below and to the side of the corresponding passenger seat 12, the degree of design freedom is severely limited. Furthermore, where the direct locking device 30 for each belt 10 is installed on the top of the tunnel 18, the anchor point is too high and passenger restraint suffers accordingly. As a result, the seatbelt system of this first embodiment has greatly reduced these drawbacks.

In addition, if the retractor mechanism 20 in the embodiment described above is provided with an inertial locking mechanism in order to cause an immediate increase in the tension on the belt 10 in a vehicular emergency (i.e., each retractor mechanism 20 is designed such that ratchet wheels are fastened to the retractor mechanism 22 and a paw actuated by an acceleration sensing device such as a pendulum, etc., is caused to engage with the ratchet wheels during a vehicular emergency such that the rotation of the retractor shaft 22 in the direction of belt extension is stopped), the time required for the tension on the corresponding belt 10 to begin to increase can be further reduced so that the passenger can be more securely protected.

Figure 4:
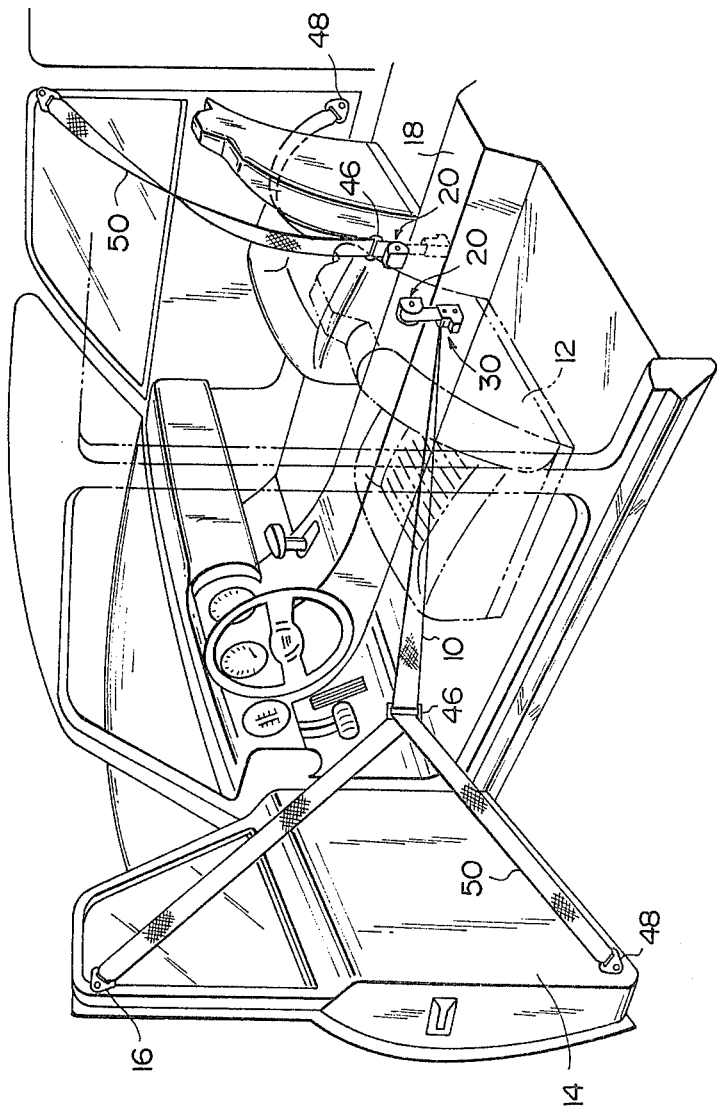
FIG. 4 is an oblique view illustrating a second embodiment of the present invention.

Referring to FIG. 4, shown therein is a second embodiment of the present invention which has been applied to a three point automatic fastening seatbelt system. The end of each belt 10 is anchored by being folded back on itself by a guide ring 46. The intermediate portion of a corresponding outer belt 50 (which runs between a shoulder anchor 16 and a lap anchor 48 which is fastened to the lower part of the corresponding door 14) is passed through the guide ring 46.

The remainder of the elements of the second embodiment are substantially the same as that of the first embodiment and a description of interconnection and operation is omitted.

Accordingly, in the second embodiment when the passenger closes the door after seating himself in the vehicle, the corresponding guide ring 46 moves towards the direct locking device 30. As a result, a 3 point seatbelt restraint is achieved in which the ends of the outer belt 50 folded through the guide ring 46 restrain respectively shoulder and lap of the passenger. Furthermore, the belt locked condition of this embodiment during a vehicular emergency is the same as that of the first embodiment.

In each of the embodiments described above, it would also be possible to make the belt turning bar of this direct locking device 30 free running in the guide slots 40 and to provide a force which drives the belt turning bar 42 towards the lower end of the guide slot 40. Furthermore, in this invention, various other types of direct locking devices 30 could also be utilized.

It should be apparent to those skilled in the art the above described embodiments are merely illustrative of but a few of the many possible specific embodiments which represent the application of the principles of the present invention. Numerous and varied other arrangements can be readily advised by those skilled in the art without departing from the spirit and scope of the invention.

I claim:

1. A seatbelt system for motor vehicles which automatically fastens or unfastens a seatbelt around a passenger which includes a passenger restraining belt and a retractor mechanism which power retracts said passenger restraining belt located at and coupled to an approximate center line of said motor vehicle, said seatbelt system being characterized by a direct locking device provided separate from and below said retracting mechanism and coupled to said vehicle body for directly locking an intermediate portion of said restraining belt during a vehicular emergency whereby the anchor point for said seatbelt is lowered during a vehicular emergency.

2. A seatbelt system according to claim 1 wherein said direct locking device locks said intermediate portion of said belt when the tension on the said belt is increased.

3. A seatbelt system according to claim 2 wherein said direct locking device comprises a belt turning bar having an intermediate portion of said belt turned there around and a locking plate arranged and configured such that belt tension causes said belt turning bar to move towards said locking plate to thereby lock said belt against said locking plate.

4. A seatbelt system according to claim 3 wherein said locking device further includes a frame fastened to said vehicle and said locking plate is fixed to said frame while said belt turning bar is coupled to said frame such that it is free to move relative to said frame.

5. A seatbelt system according to claim 4 wherein longitudinal guide slots are formed in said frame for accomodating said belt turning bar.

6. A seatbelt system according to claim 5 wherein said guide slots are curved with an appropriate curvature so that one end of said guide slot is adjacent to said locking plate.

7. A seatbelt system according to claim 6 wherein said belt turning bar is forced into a position in said guide slots which is maximally distant from said locking plate and the width of an intermediate portion of said guide slot is greater than an external diameter of said belt turning bar.

8. A seatbelt system according to claim 7 further comprising a guide shaft coupled to said frame and said belt is turned around said guide shaft in an opposite direction from the direction in which said belt is turned around said belt turning bar.

9. A seatbelt system according to claim 1 when the tip end of said belt is anchored to the door of said motor vehicle and said intermediate portion of said belt is caused to approach or move away from the seated passenger by closing or opening said door.

10. A seatbelt system according to claim 9 wherein said restraining belt comprises an outer belt anchored to a top and a bottom of said door and an intermediate portion coupled to said outer belt by a guide ring at one end and to said retractor at the other end whereby a three point seatbelt system is formed.

11. A seatbelt system according to claim 1, wherein said retractor is fastened to a top of a tunnel of a vehicle floor.

12. A seatbelt system according to claim 11, wherein said direct locking device is provided on a side area of said tunnel below said retractor mechanism.

* * * * *